United States Patent [19]

Bergmans

[11] 4,381,477

[45] Apr. 26, 1983

[54] CIRCUIT FOR A PICTURE DISPLAY DEVICE FOR CONVERTING AN INPUT D.C. VOLTAGE INTO AN OUTPUT D.C. VOLTAGE

[75] Inventor: Christianus H. J. Bergmans, Eindhoven, Netherlands

[73] Assignee: U.S. Philips Corporation, New York, N.Y.

[21] Appl. No.: 314,937

[22] Filed: Oct. 26, 1981

[30] Foreign Application Priority Data

Nov. 4, 1980 [NL] Netherlands ......................... 8006018

[51] Int. Cl.³ ......................... H01J 29/70; H01J 29/76
[52] U.S. Cl. .................................................. 315/408
[58] Field of Search ........................ 315/408, 399, 371

[56] References Cited

U.S. PATENT DOCUMENTS 3,950,674  4/1976  Joosten et al. ..................... 315/408

Primary Examiner—Theodore M. Blum

Attorney, Agent, or Firm—Robert T. Mayer; Bernard Franzblau

[57] ABSTRACT

A circuit for a picture display device for converting an input d.c. voltage into a stabilized output d.c. voltage, comprising a transformer whose primary winding is part of a first resonant network and a switch switching at line frequency the conduction period of which depends on the output voltage. Through the primary winding there flows a first sawtooth current whose retrace period is determined by the elements of the first resonant network while the output voltage at the secondary side of the transformer is generated by means of a diode. A second resonant network is included between the diode and the switch and comprises an inductance, which can be a line deflection coil, through which a second sawtooth current flows. The retrace period thereof is determined by the elements of the second resonant network and both retrace periods are initiated at the same moment.

8 Claims, 3 Drawing Figures

CIRCUIT FOR A PICTURE DISPLAY DEVICE FOR CONVERTING AN INPUT D.C. VOLTAGE INTO AN OUTPUT D.C. VOLTAGE

The invention relates to a circuit for a picture display device for converting an input d.c. voltage into an output d.c. voltage which is substantially independent of variations of the input voltage and/or variations of a load connected to the output more particularly, the invention relates to a converter circuit comprising a transformer whose primary winding is part of a resonant network which also includes a first and a second capacitor, switching means operating at line frequency to apply the voltage across the first capacitor to the primary winding, the switching means comprising a controllable switch connected to a first diode with a second diode in parallel with the series connection thus formed. The circuit further comprises an inductance which has one end connected to a first terminal of the input voltage and the other end to the primary winding while the switch is connected to the second terminal of the input voltage. This inductance is connected to the resonant network via a third diode. A secondary winding of the transformer is connected to a fourth diode whose other end is connected to a smoothing capacitor for generating the output voltage. A sawtooth current flowing during operation through the primary winding flows during a first portion of the trace period thereof through the first diode and during the remaining, second portion of the trace period through the second diode and through the switch. A supply current flows through the inductance causing energy to be stored therein while a current flows during the cutoff period of the switch through the third diode and through the inductance replenishes energy losses. The retrace period of the said sawtooth current is determined by the elements of the resonant network and the conduction period of the switch is dependent on the output voltage or a voltage proportional thereto.

Such a circuit is disclosed in the German patent application No. 2,815,425. All supply voltages of the picture display device, including the high voltage for the final anode of the picture display tube, are generated by means of this prior art circuit, while the line deflection coil is connected to a secondary winding of the transformer.

The prior art circuit has the advantage that one switching element performs the functions of the power supply section switch and of the line output stage switch.

It has however been found that connecting the line deflection coil directly to the transformer may result in ringing, which must be damped and which causes energy losses and linearity errors. In addition, there if no freedom in the choice of the retrace period, as this period must satisfy certain requirements. For television this period is approximately 12 $\mu$s (European standard).

The circuit of the invention is characterized in that a fifth diode is connected to the controllable switch and that a sixth diode is arranged in parallel with the series connection thus formed. A second resonant network comprises a second inductance and a trace- and a retrace capacitor included between the connecting point of the fifth and the sixth diode and the connecting point of the fourth diode and the smoothing capacitor. Through the second inductance there flows in operation a second sawtooth current of line frequency which flows during a first portion of the trace period thereof through the sixth diode and during the remaining, second portion thereof through the fifth diode and the switch, the retrace period of the second sawtooth current being determined by the elements of the second resonant network and the starting moment of the retrace period of the second sawtooth current coinciding with the starting moment of the retrace period of the said first sawtooth current.

The circuit comprises one single switching element, but the deflection section and the power supply section are not directly coupled to each other so that a greater freedom is furnished thanks to the two tunning circuits The circuit of the invention may be characterized in that the trace capacitor is the smoothing capacitor included between the electrode of the fourth diode which is not connected to the secondary winding of the transformer and the second terminal of the input voltage.

Advantageously, the circuit may be characterized in that the second inductance is a line deflection coil and the trace capacitor provides an S-correction.

Alternatively, the circuit may be characterized in that the trace capacitor is arranged in series with a line deflection coil and that the series network thus formed is in parallel with the sixth diode. Preferably, the circuit is characterized in that the retrace period of the second sawtooth current is shorter than the retrace period of the first sawtooth current.

The circuit may be characterized in that a seventh diode is connected between the connection of the first resonant network and the first diode on the one hand and the switch on the other hand for cutting-off the fifth diode in the period of time in which the switch does not conduct.

For providing the east-west raster correction the circuit may be characterized in that a modulation source for the east-west correction is included between the secondary winding end which is not connected to the fourth diode and the second terminal of the input voltage or that a transistor is arranged in series with the second resonant network and that a modulation source for the east-west correction is included in the base lead thereof, the connecting point of the transistor and the second resonant network being connected to a second smoothing capacitor.

The invention will now be further described by way of non-limitative example with reference to the accompanying drawing in which.

Figure 1:
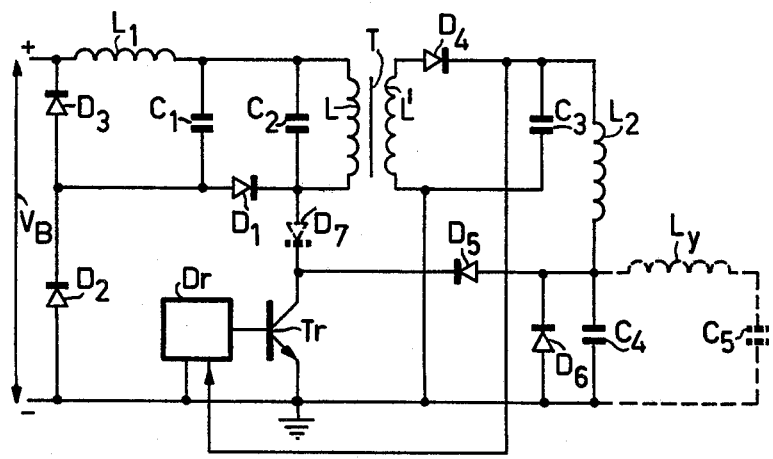
FIG. 1 shows an embodiment of a circuit according to the invention.

Referring to FIG. 1, Tr denotes a switching transistor of the npn-type whose collector is connected to one end of the primary winding L of a transformer T. The other end of winding L is connected to one end of an inductance $L_1$, whose other end is connected to the positive terminal of a d.c. voltage source $V_B$, for example a mains rectifier. The emitter of transistor Tr is connected to the negative terminal of source $V_B$, which terminal may be connected to ground.

The anode of a diode $D_2$ is connected to this negative terminal, while the cathode of a diode $D_3$ is connected to the positive terminal. The cathode of diode $D_2$ is connected to the anode of diode $D_3$ and to the anode of a further diode $D_1$, whose cathode is connected to the collector of transistor Tr. Via a capacitor $C_1$ the connecting point of the three diodes is connected to the connecting point of inductance $L_1$ and winding L, while a capacitor $C_2$ is arranged in parallel with winding L.

A driver stage Dr is included in the base lead of transistor Tr for producing switching pulses whose repetition frequency is the television line frequency, i.e. the frequency of the horizontal deflection in a picture display tube, not shown.

One end of a secondary winding L' of transformer T is connected to the anode of a diode $D_4$ and the other end to the negative terminal of source $V_B$. A smoothing capacitor $C_3$ is connected between this terminal and the cathode of diode $D_4$.

The circuit described so far is of a known type and is described in the publication referred to above. Voltages generated at the secondary side of transformer T are stabilised by the action of this circuit. To this end the duration of the drive pulses of stage Dr are modulated in dependence on a rectified secondary voltage, for example the voltage present across capacitor $C_3$, of the transformer. These rectified voltages are substantially independent of the fluctuations of the electric mains from which voltage $V_B$ has been derived, and of fluctuations of the loads connected thereto and they are used to supply sections of the picture display device, for example a television receiver, of which the circuit of FIG. 1 is a part. One of these d.c. voltages may be the high voltage for the final anode of the picture display tube.

In accordance with the invention the cathode of a diode $D_5$ is connected to the collector of transistor Tr. The anode of diode $D_5$ is connected to the cathode of a further diode $D_6$ and to a capacitor $C_4$. The anode of diode $D_6$ and the other terminal of capacitor $C_4$ are connected to the negative terminal of source $V_B$. An inductance $L_2$ is included between the connecting point of diode $D_4$ and capacitor $C_3$ and the connecting point of elements $D_5$, $D_6$ and $C_4$.

During operation, either transistor Tr conducts, as a result of which also diode $D_5$ conducts, or diode $D_6$ conducts during a predetermined portion of the period. So in this time period inductance $L_2$ is connected to the voltage from capacitor $C_3$. In the remaining portion of the period in which transistor Tr and diode $D_6$ are cut off, inductance $L_2$ forms a resonant circuit in combination with capacitor $C_4$ whose capacitance is many times smaller than that of capacitor $C_3$. A sawtooth current having a trace during the first considered portion of the period and a retrace during the remaining portion thereof flows through inductance $L_2$. The duration of the retrace period is determined by the resonant frequency of the resonant circuit. In this period of time a sinusoidal voltage is produced at the connecting point of diode $D_6$ and capacitor $C_4$. At the instant at which this voltage has become zero again diode $D_6$ is rendered conductive, which initiates the trace.

At an instant determined by the pulse duration modulation in driver stage Dr, transistor Tr is rendered conductive. The current through inductance $L_2$ continues to flow through diode $D_6$ until its direction reverses approximately in the middle of the trace period. The current then flows through diode $D_5$ and transistor Tr. At the instant at which transistor Tr is cut off in response to a pulse from driver stage Dr the trace period ends and the retrace is initiated.

From the foregoing it will be apparent that the circuit formed by elements Tr, $D_5$, $D_6$, $L_2$, $C_3$ and $C_4$ behaves as a line deflection circuit. So inductance $L_2$ can be the line deflection coil for the horizontal deflection of the picture tube. $C_3$ then is the trace capacitor and $C_4$ the retrace capacitor. The circuit can also comprise further known elements, for example a linearity correction arrangement, which are not important to the invention and which are therefore not shown in FIG. 1. The circuit can also be modified in known manner, for example by arranging capacitor $C_4$ in parallel with coil $L_2$.

During the cut-off period of transistor Tr also winding L and capacitor $C_2$ also form a resonant circuit across which a sinusoidal oscillation is produced. The duration thereof is determined by the resonant frequency of the circuit. At the instant at which the oscillation has become zero again, diode $D_1$ becomes conductive. As diode $D_3$ is also conducting, the voltage at the collector of transistor Tr between the said instant and the instant at which the transistor is rendered conductive is approximately equal to the voltage of source $V_B$. Consequently, the voltage at the collector varies with time in the manner shown in FIG. 2a. Herein T represents the line period while $\delta$ T represents the portion of the period in which transistor Tr conducts. $\tau$ denotes the duration of the above-mentioned oscillation, i.e. the retrace period of the sawtooth current flowing through winding L.

The winding sense of winding L' and the direction of conduction of diode $D_4$ can be such that diode $D_4$ conducts in time period $\tau$ for replenishing the losses of the deflection circuit and of any other loads on capacitor $C_3$. The capacitance of this capacitor can be chosen such that a parabolic voltage of line frequency is present thereacross, as a result of which the line deflection current through coil $L_2$ is subject to what is commonly called the S-correction. This is, however, not possible if, in contrast therewith, diode $D_4$ conducts in the remaining portion of period T outside time period $\tau$. In both cases a direct current, which causes a shift to the left on the picture screen of the picture display tube, flows through inductance $L_2$. If this shift is too great then inductance $L_2$ cannot function as the line deflection coil. The coil $L_Y$ is then connected in series with a trace capacitor $C_5$ and the series network thus formed is arranged in parallel with diode $D_6$. This is shown in FIG. 1 by means of a broken line. The said parabolic voltage is present across capacitor $C_5$ while across capacitor $C_3$, which has a larger capacitance than capacitor $C_5$, there is a d.c. voltage which is equal to the mean value of the parabolic voltage.

FIG. 2b shows the variation of the voltage across diode $D_6$. From this it is apparent that the retrace period of the line deflection current starts at the same instant as time $\tau$ but that the duration $\tau'$ thereof, as this duration is determined by other circuit elements, may have a different value, in this example less than $\tau$. $\tau'$ has the value prescribed by the television standard for the television receiver of which the circuit of FIG. 1 forms a part, i.e. approximately 12 $\mu$s for the European or the American standards, while $\tau$ can be chosen at option. It holds more specifically that the longer $\tau$ is the lower the maximum voltage at the collector of the transistor Tr. In a practical embodiment $\tau = 15$ $\mu$s was a suitable value.

Figure 2:
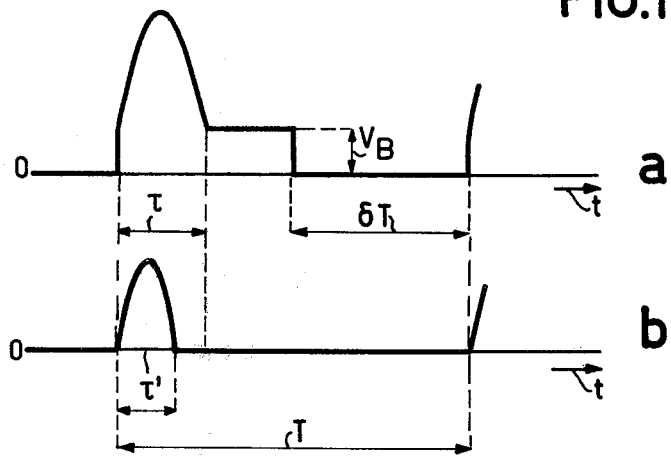
FIG. 2 shows two waveforms occurring therein.

It will be noted that the voltage of FIG. 2b must not become higher than the voltage of FIG. 2a. Should this occur in a predetermined time interval outside the time period $\delta\tau$ by the choice of the amplitude and/or the duration of the sinusoidal pulses, then diode $D_5$ would be rendered conductive, causing a distortion of the waveforms of FIG. 2 and, consequently, of the line deflection current. This can be prevented by a suitable dimensioning of the circuit, particularily by the choice of the transformation ratio between windings L and L'. Alternatively, a separation diode $D_7$, which is shown in FIG. 1 by broken lines, may be provided between the connecting point of elements $D_1$, L and $C_2$ and the connecting point of elements Tr and $D_5$. From the foregoing it appears that, in spite of the fact that the circuit comprises only one switch Tr, both parts of the circuit can be designed independently of each other and particularily that the tuning of the circuit L, $C_2$ can be determined in view of the maximum permissible collector voltage of the transistor only. δ The conduction period T of transistor Tr must indeed satisfy the condition that the transistor is turned-on before the centre instant of the trace period but not before the end of time $\tau'$. With $\tau' \approx 12$ μs and $T \approx 64$ μs this condition implies that δ must be approximately between 0.4 and 0.8.

Figure 3:
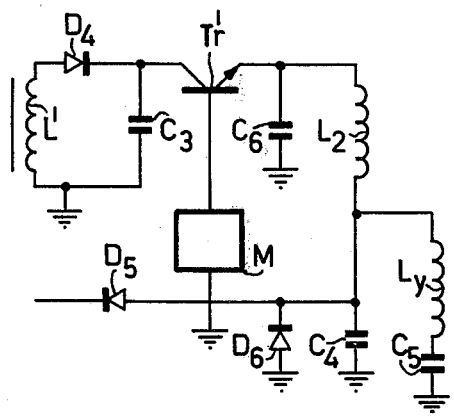
FIG. 3 shows a portion of the circuit of FIG. 1 which has been modified for the east-west correction.

For the east-west raster correction a modulation voltage can be added to the trace voltage, i.e. the voltage across capacitor $C_3$. To this end a source, generating a field frequency which is added to the trace voltage and is usually parabolic, can be included between the connecting point of winding L' and capacitor $C_3$ and the negative terminal of source $V_B$. Since this source does not influence the trace voltages, the modulation does not influence the supply section of the circuit. Consequently, the d.c. voltage generated thereby are not subject to modulation, but the amplitude of the line deflection current through inductance $L_2$ or $L_Y$, respectively varies in the desired way. FIG. 3, which shows only a portion of the circuit, is modified compared to FIG. 1, in that a transistor Tr' is included in series with inductance $L_2$. The base of transistor Tr' is controlled by a modulation source M of the field frequency. A capacitor $C_6$ (across which the modulation voltage of field frequency is present and which is a smoothing capacitor for signals of the line frequency) is included between the emitter of transistor Tr' and the negative terminal of source VB.

I claim:
1. A circuit for a picture display device for converting an input d.c. voltage into an output d.c. voltage which is substantially independent of variations of the input voltage and/or variations of a load connected to the output voltage, comprising a transformer whose primary winding is part of a resonant network which also includes a first and a second capacitor, switching means for applying at line frequency the voltage across the first capacitor to the primary winding, the switching means comprising a controllable switch connected to a first diode with a second diode in parallel with the series connection thus formed, the circuit further comprising an inductance which has one end connected to a first terminal of the input voltage and the other end to the primary winding is part of a first resonant network which also includes a first and a second capacitor, switching means operative at line frequency to apply the voltage across the first capacitor to the primary winding, the switching means comprising a controllable switch connected in series with a first diode and with a second diode connected in parallel with the series connection of the switch and the first diode, an inductance having one end connected to a first terminal of the input voltage and the other end to the primary winding, means connecting the switch to a second terminal of the input voltage, means coupling the inductance to the resonant network via a third diode means connecting a secondary winding of the transformer to a fourth diode connected in turn to a smoothing capacitor for generating the output voltage, a sawtooth current flowing during operation through the primary winding flowing during a first portion of the trace period thereof through the first diode and during the remaining, second portion of the trace period through the second diode and through the switch, a supply current flowing through the inductance causing energy to be stored therein while a current flowing during the cut-off period of the switch through the third diode and through the inductance replenishes energy losses, the retrace period of the said sawtooth current being determined by the elements of the first resonant network and the conduction period of the switch being dependent on the output voltage, a fifth diode serially connected to the controllable switch and a sixth diode coupled in parallel with the series connection of the switch and fifth diode, a second resonant network comprising a second inductance, a trace and a retrace capacitor being included between the connecting point of the fifth and the sixth diode and the connecting point of the fourth diode and the smoothing capacitor, through which second inductance there flows during operation a second sawtooth current of line frequency which flows during a first portion of the trace period thereof through the sixth diode and during the remaining, second portion thereof through the fifth diode and the switch, the retrace period of the second sawtooth current being determined by the elements of the second resonant network and the starting moment of the retrace period of the second sawtooth current coinciding with the starting moment of the retrace period of the first sawtooth current.

2. A circuit as claimed in claim 1, wherein the trace capacitor comprises the smoothing capacitor between the output electrode of the fourth diode and the second terminal of the input voltage.

3. A circuit as claimed in claims 1 and 2, characterized in that the second inductance is a line deflection coil and the trace capacitor provides S-correction.

4. A circuit as claimed in claim 1, wherein the trace capacitor is connected in series with a line deflection coil and that the series network thus formed is coupled in parallel with the sixth diode.

5. A circuit as claimed in claim 1, wherein the circuit elements of the first and second resonant networks are chosen so that the retrace period of the second sawtooth current is shorter than the retrace period of the first sawtooth current.

6. A circuit as claimed in or of the preceding claims, characterized in that a seventh diode is connected between the connection of the first resonant network and the first diode on the one hand and the switch on the other hand for cutting-off the fifth diode in the period of time in which the switch does not conduct.

7. A circuit as claimed in or of the preceding claims, characterized in that a modulation source for the east-west raster correction is included between the secondary winding end which is not connected to the fourth diode and the second terminal of the input voltage.

8. A circuit as claimed in or of the claims 1 through 6, wherein a transistor is connected in series with the second resonant network and that a modulation source for the east-west correction is included in the base lead thereof, the connecting point of the transistor and the second resonant network being connected to a second smoothing capacitor.

* * * * *

UNITED STATES PATENT AND TRADEMARK OFFICE
CERTIFICATE OF CORRECTION

PATENT NO. : 4,381,477
DATED : April 26, 1983
INVENTOR(S) : CHRISTIANUS H.J. BERGMANS It is certified that error appears in the above—identified patent and that said Letters Patent is hereby corrected as shown below:

Col. 4, line 9, delete "also"

Col. 5, line 14, change "T" to --$\int T$-- line 27, "voltages" should be --voltage-- line 29, "voltage" should be --voltages-- line 32, insert --,-- before "varies"

line 34, after "Fig. 1" delete ","

UNITED STATES PATENT AND TRADEMARK OFFICE
CERTIFICATE OF CORRECTION

PATENT NO. : 4,381,477

DATED : April 26, 1983

INVENTOR(S) : CHRISTIANUS H.J. BERGMANS

It is certified that error appears in the above—identified patent and that said Letters Patent is hereby corrected as shown below:

Col. 6; Claim 7, line 1, cancel "or of the preceding claims," and insert --claims 1,2,4 or 5,--

Col. 6; Claim 8, line 1, cancel "or of the claims 1 through"

Col. 6; Claim 8, line 2, cancel "6," insert --claims 1,2,4 or 5,--

Col.1, line 10, after "output" insert --.--

Col.1, line 10, "more" should be --More--

Col.1, line 36, "replenishes" should be --to replenish--

Col.1, line 41, delete "output voltage or a voltage proportional thereto"

Col.2, line 13, after "circuits" insert --.--

UNITED STATES PATENT AND TRADEMARK OFFICE
CERTIFICATE OF CORRECTION

PATENT NO. : 4,381,477

DATED : April 26, 1983

INVENTOR(S) : CHRISTIANUS H.J. BERGMANS

It is certified that error appears in the above—identified patent and that said Letters Patent is hereby corrected as shown below:

line 28, after "diode" insert --,--

Col. 6; Claim 1, line 46, after "and" insert --the--

Col. 6; Claim 2, line 2, after "smoothing capacitor" insert --, said capacitor being connected--

Col. 6; Claim 3, line 1, change "and" to --or--

Col. 6; Claim 4, line 3, delete "that"

Col. 6; Claim 6, line 1, cancel "or of the preceding claims," and insert --claims 1,2,4 or 5,--

UNITED STATES PATENT AND TRADEMARK OFFICE
CERTIFICATE OF CORRECTION

PATENT NO. : 4,381,477
DATED : April 26, 1983
INVENTOR(S) : CHRISTIANUS H.J. BERGMANS It is certified that error appears in the above—identified patent and that said Letters Patent is hereby corrected as shown below:

Col. 5; Claim 1, line 6, after "a" insert --first-- line 8, delete "for applying" insert --operative-- line 8, after "frequency" insert --to apply-- line 10, delete "to" insert --in series with-- line 11, after "first diode" insert --and-- line 11, after "second diode" insert --connected-- line 12, delete "thus formed, the circuit further comprising"

Signed and Sealed this

Sixteenth Day of July 1985

[SEAL]

Attest:

DONALD J. QUIGG

Attesting Officer    Acting Commissioner of Patents and Trademarks

UNITED STATES PATENT AND TRADEMARK OFFICE
CERTIFICATE OF CORRECTION

PATENT NO. : 4,381,477
DATED     : April 26, 1983
INVENTOR(S) : Christianus H.J. Bergmans It is certified that error appears in the above-identified patent and that said Letters Patent is hereby corrected as shown below:

Column 5, Claim 1, delete lines 13 through 21
                 line 22, delete "the series connection"

Signed and Sealed this

Thirty-first Day of December 1985

[SEAL]

Attest:

DONALD J. QUIGG

Attesting Officer

Commissioner of Patents and Trademarks